United States Patent [19]
Ahlstone

[11] 4,294,477
[45] Oct. 13, 1981

[54] FLEXIBLE RING GASKET RETAINER FOR FLANGED CONNECTORS

[75] Inventor: Arthur G. Ahlstone, Ventura, Calif.
[73] Assignee: Vetco Inc., Ventura, Calif.
[21] Appl. No.: 42,461
[22] Filed: May 29, 1979

Related U.S. Application Data

[63] Continuation of Ser. No. 804,584, Jun. 8, 1977, abandoned.

[51] Int. Cl.³ .............................................. F16L 17/06
[52] U.S. Cl. .................................... 285/336; 277/180; 277/189; 285/363; 285/379
[58] Field of Search .................. 285/18, 23, 24, 27, 285/336, 334.2, 379, 380, DIG. 18, 363, 111, 110; 277/9.5, 10, 11, 171, 180, 167.5, 189

[56] References Cited

U.S. PATENT DOCUMENTS

| | | | |
|---|---|---|---|
| 359,394 | 3/1887 | Jones et al. | 285/336 X |
| 2,291,709 | 8/1942 | Goetze | 285/336 |
| 2,753,197 | 7/1956 | Loeffler | 285/336 |
| 2,863,679 | 12/1958 | Dunbur | 285/336 |
| 3,321,217 | 5/1967 | Ahlstone | 285/336 |
| 3,387,867 | 6/1968 | Rogers | 285/336 |
| 3,521,892 | 7/1970 | Sheesley et al. | 285/336 X |
| 3,603,617 | 9/1971 | Lochridge | 285/379 |
| 3,628,812 | 12/1971 | Larralde | 285/334.2 |
| 3,661,408 | 5/1972 | Gibbons | 285/18 |

FOREIGN PATENT DOCUMENTS

4635801 2/1968 Japan .............................. 277/167.5

Primary Examiner—Dave W. Arola
Attorney, Agent, or Firm—Subkow and Kriegel

[57] ABSTRACT

A ring gasket is retainer in position on a pipe connector flange with the ring gasket properly positioned for sealing engagement and loading between opposed circular grooves in the flange and a mating flange or member. The ring gasket is supported on one of the connector parts by a spacer ring or by a portion of the flange which effects a standoff between the connector parts when they are connected. The support for the ring gasket includes a flexible connection between the inside of the spacer ring and the outer periphery of the ring gasket. The ring gasket has outer peripheral, oppositely tapered sealing surfaces loaded into sealing engagement with opposing companion surfaces forming the grooves in the flanges upon making up of the connection, and the flexible connection between the spacer ring and the ring gasket permits such axial movement of the ring gasket as is necessary to enable loading thereof.

18 Claims, 7 Drawing Figures

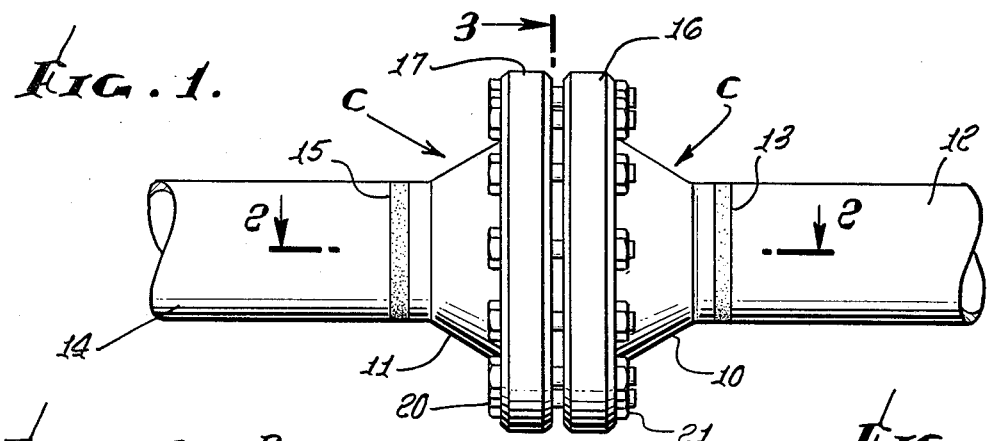
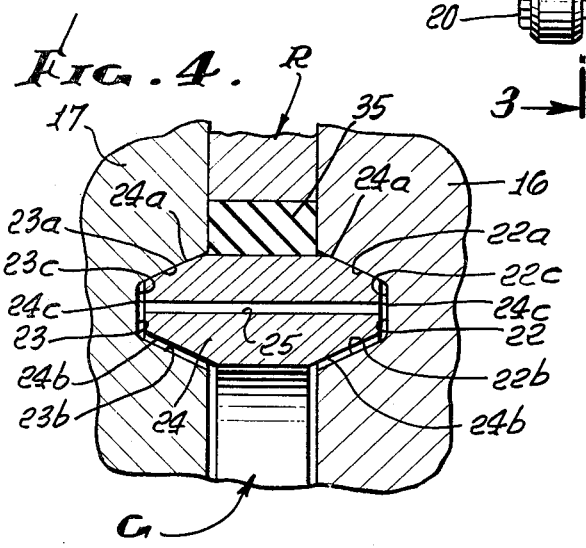
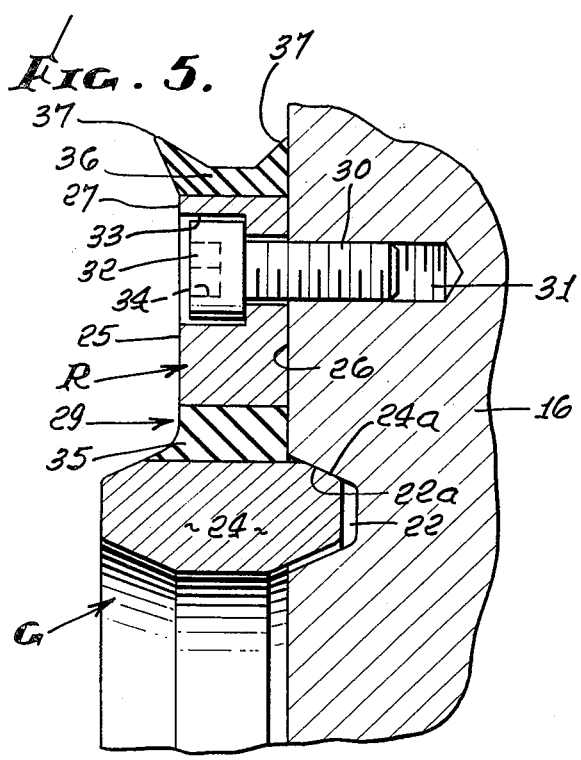
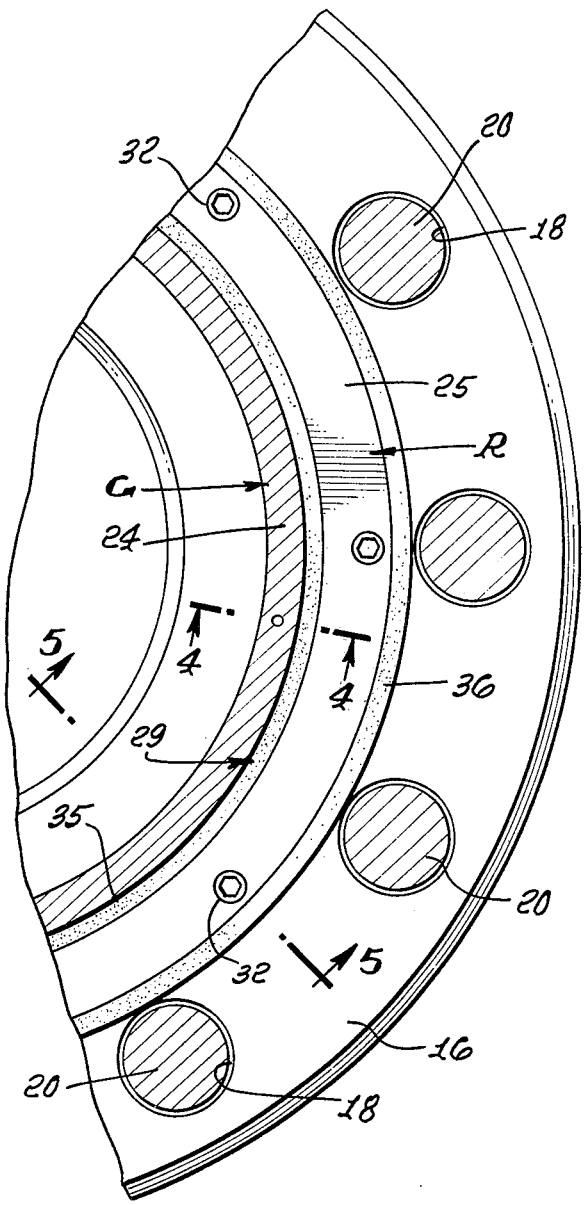

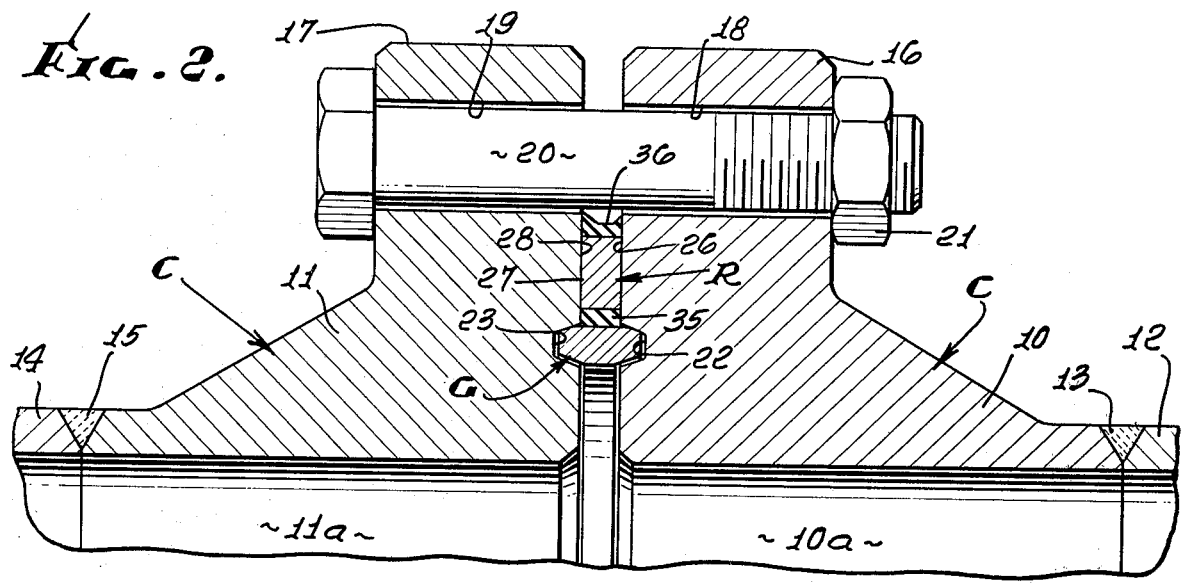
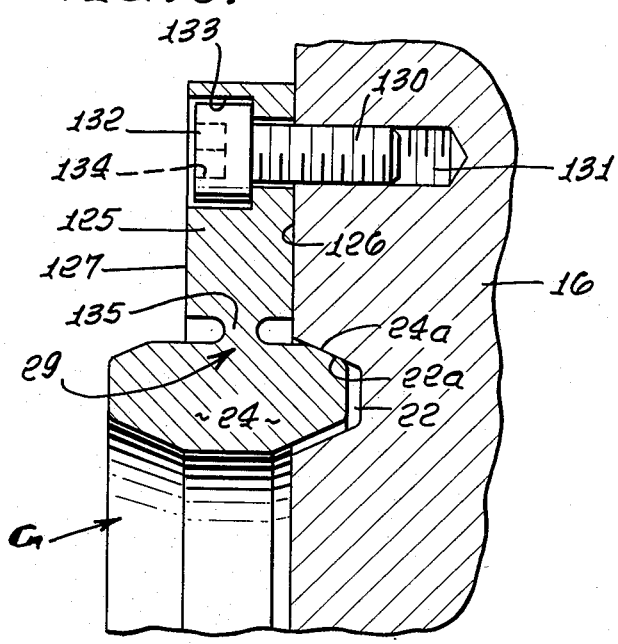
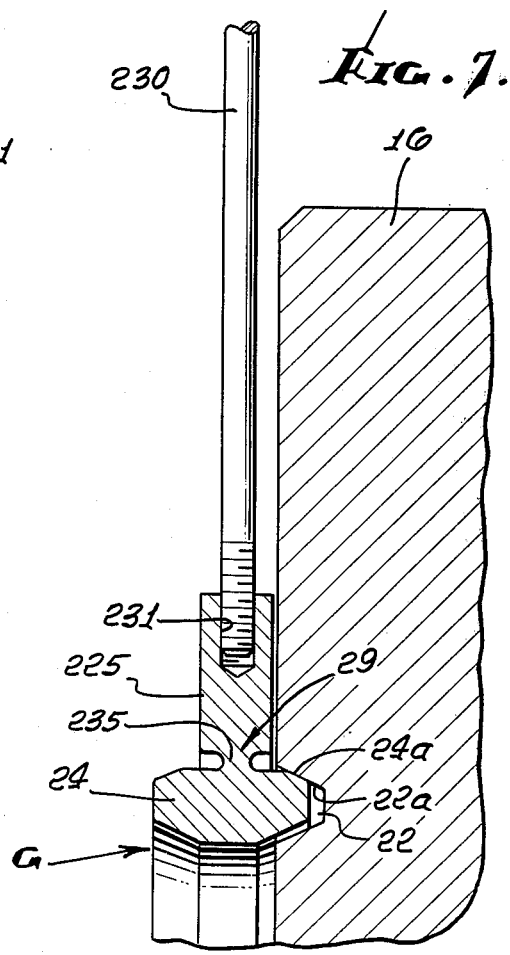

FLEXIBLE RING GASKET RETAINER FOR FLANGED CONNECTORS

This application is a continuation of my pending application, Ser. No. 804,584; filed June 8, 1977 now abandoned.

BACKGROUND OF THE INVENTION

Flanged pipe connections for pipe lines, well heads and the like commonly involve the interconnection of opposed flanges or a flange and another member to engage and load a soft iron ring gasket in opposing circular grooves in the confronting flange or member surfaces. Such connectors are, for example, the subject of specifications of the American Petroleum Institute (API) and have become standardized.

When such connections are being made up with the flanges or members disposed horizontally or nearly horizontally, initial manual positioning or locating of the ring gasket in an upwardly opening circular groove is a relatively simple matter. The bringing or stabbing together of the connector parts may also be relatively simple. In the case of connections being made under stable conditions, on land, if the ring gasket tends to shift laterally, it is also a simple matter to manually hold the ring gasket in place as the connector parts are moved together, although there is danger of hand or finger injury.

Such connections, however, are also being widely used in unstable or difficult environments, for example, for underwater pipe lines and connectors where divers are employed to make up the connectors, and the manual holding of the ring gasket in position is very difficult and tricky, particularly if the diver or divers are required to manually push or pull on the connector parts to bring them into position for connection. The problems are accentuated where the connector is being made up in a horizontal or other non-vertical pipe line or connector.

As disclosed in my companion application for patent, Ser. No. 804,726, filed June 8, 1977, now abandoned and application Ser. No. 43,335 filed May 29, 1979, which is a continuation of Ser. No. 804,726, means are provided for initially positioning and locating a ring gasket with respect to the circular groove in one flange connector part, so that the ring gasket is properly positioned for sealing engagement in both of the opposed circular grooves of the companion connector parts when the connector is made up.

More particularly, means are provided for supporting the ring gasket on or adjacent to one of the connector parts, so that the ring gasket remains in proper position for engagement in the grooves of the connector parts, without regard for the angle at which the connector parts may be disposed during makeup. Accordingly, in the case of an underwater connection made up by a diver or divers, the difficult task of manually positioning the ring gasket between the flanges and the hazard to the hands are avoided. The invention renders more safe the making up of such connections even under more stable or surface conditions, and even when the connector parts are on vertical axes, the locating of the ring gasket for proper engagement between the connector parts is assured.

The offshore oil and gas industry has standardized on the use of ring gaskets of the type designated "RX" or "BX" by the API. Reference is made to the "API SPECIFICATION FOR WELL-HEAD EQUIPMENT", API Spec. 6A, Tenth Edition, March, 1974, American Petroleum Institute, Division of Production, Dallas, Tex., pages 33 and 34, for examples of such ring gaskets and companion grooves in flange connections. The present invention is particularly directed towards supporting and positioning such ring gaskets, but is also applicable to the type "R" ring gaskets, see the API specification, page 32, for examples.

Connectors of the type here involved, because of the standards by which the parts are made, cannot be easily or acceptably modified in a significant manner. The connectors using the "RX" type ring gaskets are made up with a load carrying spacer ring between the confronting faces having the grooves which receive the ring gasket or with the confronting faces in engagement. Any variation may result in an ineffective loading of the ring gasket by the sealing walls which form one side of the grooves. On the other hand, "BX" type ring gaskets are normally used in connectors which are made up with the opposing, groove containing surfaces in abutting engagement, and the ring gasket may be deformed into engagement with both side walls of one or both of the grooves.

Broadly speaking, the invention relates to supporting and positioning the ring gasket for engagement in the grooves of the connector or flange parts. Specifically, the invention relates to supporting and positioning the ring gasket of the above-identified "RX" type for engagement in the grooves of the connector or flange part by means of a spacer ring or flange part which limits the movement of the connector parts together, the ring gasket being initially loaded between opposing groove surfaces in the respective connector parts and being pressure loaded from within the connector. In the forms of the invention herein disclosed, in a specific sense, the spacer is a ring connected to or supportable adjacent to one connector part or an abutment flange portion and having means holding the ring gasket in position in the groove of that part in contact with the outer marginal sealing wall of the groove, so that when the companion connector part is assembled against the gasket ring, the ring will engage the other outer sealing wall and be loaded between the sealing walls, to an extent determined by the spacer or flange portion for pressure response from the internal fluid to maintain the seal over the full range of pressures for which the connector is designed.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 1 is a side elevation showing a pipe connector incorporating the ring gasket retainer for flanged connectors embodying the invention;

FIG. 2 is an enlarged fragmentary longitudinal section taken on the line 2—2 of FIG. 1;

FIG. 3 is an enlarged fragmentary transverse section taken on the line 3—3 of FIG. 1;

FIG. 4 is a further enlarged fragmentary detailed view in radial section taken on the line 4—4 of FIG. 3;

FIG. 5 is an enlarged fragmentary radial section as taken on the line 5—5 of FIG. 3, illustrating one form of ring gasket retainer, before make up of the connection;

FIG. 6 is a fragmentary radial section generally corresponding to FIG. 5 but showing another form of ring gasket retainer; and FIG. 7 is another fragmentary radial section showing a further form of ring gasket retainer.

As seen in the drawings, a pair of mating connector parts, in the form of flanged connectors C, have tubular housings 10 and 11. One length of pipe 12 is secured to the connector housing 10 by a circumferentially continuous weld 13 and another length of pipe 14 is secured to the other connector housing 11 by a circumferentially continuous weld 15. Each connector housing 10 and 11 has a radially outwardly projecting, circumferentially continuous connector flange designated 16 and 17, respectively. The flange 16 has a suitable number of circumferentially spaced bolt holes 18 and the flange 17 has a corresponding plurality of bolt holes 19, adapted to be aligned when the flange connector is being made up, for the reception of bolts 20, and retaining nuts 21 are adapted to be tightened down on the bolts to load the flanges 16 and 17 together, with a ring gasket G axially preloaded in opposing annular grooves 22 and 23 in the respective connector parts 10 and 11, so that the ring gasket will prevent leakage between the flanges 16 and 17. Such connectors of the flanged type, employing soft iron ring gaskets G, are generally the subject of the above-identified API specification for well head equipment.

Typically when such connectors are being made up and the angle of the pipe is such that the ring gasket does not tend to seat in one of the opposing grooves to be held by gravity in a proper position for engagement between the flanges, the gasket must be manually held in position. Even in the case of fairly large pipe connectors, the holding of the ring gasket in initial position can be hazardous and very difficult, particularly in the case of underwater connections which are being made by divers who are wearing diving gear and gloves which make such manual activities very difficult.

The present invention provides retaining means R for initially supporting the ring gasket G and holding the same in a proper position with respect to one of the grooves in one of the connector parts, while the other connector part is being moved into place and the bolt holes 18 and 19 aligned for reception of the bolts 20 and the application thereto of the nuts 21.

The retaining means are, as herein illustrated in a specific sense, incorporated in spacer means which also function to limit the loading of the connector flanges towards one another and establish a predetermined spaced relation between the flanges and correspondingly between the opposing grooves 22 and 23, for the proper seating, loading and sealing effect of the ring gasket G.

As seen in FIG. 4, the ring gasket G is in preloaded and sealing relation to the opposing flanges 16 and 17 in the opposing respective grooves 22 and 23. The groove 22 is formed in the flange or member 16 by an outer, inclined circumferentially continuous sealing wall 22a, and an opposing inner, inclined wall 22b diverging from a base or bottom wall 22c. Correspondingly, the groove 23 in the flange 17 is formed by an outer, inclined, circumferentially continuous sealing wall 23a and an opposing inclined, inner wall 23b diverging from a base wall 23c. The ring gasket G has a central ring body 24, at each end of which is an outer beveled or tapered wall 24a, adapted to sealingly engage against the opposing inclined walls 22a and 23a of the respective flanges, when the connector parts are brought together by the bolts 20 and nuts 21. Engagement of the confronting beveled walls 22a and 23a with the gasket ring walls 24a establishes an axial and circumferential preload between these sealing flange and gasket ring walls.

The retainer means R, to be more particularly described below, serves to limit movement of the flanges 16 and 17 towards one another, and it is desired that the resultant predetermined spacing between the flanges is such that the opposite end surfaces or walls 24c of the ring gasket are not in sealing contact with the base walls 22c and 23c of the respective grooves, and that neither of the inner peripheral angular surfaces 24c at opposite ends of the ring gasket body are in sealing engagement with the respective groove walls 22b and 23b.

When the connector is properly made up and the ring gasket G is in proper position, as just described above, it will be observed that the pressure of fluid within the fluid passages 10a and 11a of the connector acts across the entire inner periphery of the ring gasket to establish a high pressure loaded unit loading of the opposed angular surfaces 22a and 24a and the opposed angular surfaces 23a and 24a of the flanges and the ring gasket, so that the connector can withstand high pressures, without leaking. In the event that one of the angular ring gasket walls 24b should be caused to engage one of the flange walls 22b or 23b, then fluid pressure can pass between the ring gasket and the other of the walls 22b or 23b to find access to the space between the end surfaces 24c of the ring gasket and the base 22c or 23c of the grooves and can be equalized across the ends of the ring gasket by access to the base of the other groove, through an equalizing port or ports 25, which extend longitudinally through the ring gasket body 24 at a suitable number of circumferentially spaced locations. Such ports 25 are required in some API ring gaskets, but not in others.

Referring more particularly to FIG. 5, the ring gasket retaining means R are adapted to initially support the ring gasket body 24, with one tapered end thereof disposed within the groove 22, and with the other tapered end of the body 24 disposed for engagement within the companion flange groove when the connector is assembled.

Accordingly, the retaining means R comprises an annular support member 25 projecting axially from the end face 26 of the flange 16, and having a flat end face 27 engageable by the opposing end face 28 of the other flange 17, when the connector is assembled, to maintain the proper axial spacing of the two connector parts, so that the ring gasket G is properly preloaded and pressure responsive as described above.

To accomplish this, the ring gasket G is supported within the retainer ring 25 by means 29 and the retainer ring is positioned or located relatively to the flange 16 so that the ring gasket body has its beveled outer surface 24a initially disposed as seen in FIG. 5 immediately adjacent to or contacting the outer angular wall 22a of the groove 22 in the flange 16, and the support means 29 mount the support ring 25 on the ring gasket body 24 in such a manner that when the companion connector flange 17 is loaded against the spacer ring 25, the ring gasket body is enabled to shift axially to the extent necessary to axially and circumferentially load the opposing angular walls of the ring gasket and the flange grooves.

In the embodiment of FIG. 5, the spacer ring 25 is mounted against the end face 26 of the flange 16 by means of a suitable number of screw fasteners 30 having stems threaded into bores 31 in circumferentially spaced relation about the flange 16, the fasteners having heads 32 recessed in counter bores 33 in the outer side of the support ring 25, the screw heads having suitable tool engaging recesses 34 enabling them to tightly force the support ring 25 against the flange face 26. In this form, the supporting means 29 for supporting the ring gasket in the support ring comprises a body or ring of elastomeric material 35 which resiliently or flexibly supports the ring gasket body 24 and is molded or bonded thereto, so as to allow such movement of the ring gasket as may be necessary during loading between the opposed flanges 16 and 17. Since the ring gasket is pressure loaded from within the connector, as previously described, it may also be desired that an external seal be provided between the flanges. Accordingly, in this form, external sealing means are provided in the form of an elastomeric sealing ring 36 of cup-shaped section. This seal ring 36 extends about the outer periphery of the support ring 25 and has circumferential outwardly projecting lips 37 sealingly engageable with the opposed flanges 16 and 17 when the connector is made up.

In FIG. 6 a further form of ring gasket retainer is shown. A support ring 125 is secured adjacent to the radial surface 126 of the flange 16 and provides the stand-off surface 127 engageable with the opposing radial surface of the flange 17 when the connector is made up to load the ring gasket body 24 between the beveled walls 22a and 23a forming the grooves 22 and 23. Fasteners 130 engaged in circumferentially spaced threaded bores 131 have their heads 132 recessed in counterbores 133 and have tool engaging recesses 134 enabling tightening of the fasteners 130. The support ring may be made up tight against the flange face 126 or may be loosely supported. In either case, the connecting means 29 which secures the gasket ring 6 locates the ring face 24a at or close to the wall 22a forming groove 22. The connecting means is in the form of a thin web 135 integral with the gasket ring 24 and the support ring 125. The web may be circumferentially continuous or in segments and will enable such flexing or bending as may be necessary to allow preloading of the gasket ring, when the connector is made up.

As seen in FIG. 7, the support ring 225 supports the gasket ring 24 by means 29, again in the form of a web 235 integral with the support ring and the gasket ring, and the web 235 will flexibly permit such relative motion as may be necessary to enable the gasket ring to be loaded between the flange grooves when the connector is made up. In this form, the support ring 225 is adapted to be manually supported by means of a suitable number of rods 230 threaded into radially opening bores 231 and projecting outwardly past the outside diameter of the flange 16, so that the support ring can be safely and easily positioned between the flanges by a diver or a subsea manipulator, when the connection is being made.

From the foregoing, it will now be apparent that the present invention provides a simple and efficient means for locating and holding API ring gaskets in position for make up of flange type connections wherein the support ring supports the gasket ring within the inner periphery of the support ring; the flanges are properly spaced; and the connecting means permits any necessary axial or circumferential displacement or deformation of the gasket ring.

I claim:

1. In a connector: a pair of connector bodies having a fluid passage therein when said bodies are connected together, said bodies having opposed radial surfaces with circumferentially continuous grooves circumscribing said fluid passage and defined between inner and outer side walls converging outwardly from the bottom of the groove, a metal gasket ring in said grooves in sealing and radially inwardly loaded engagement with at least said outer side walls, retainer means carried by one of said bodies, means connecting said retainer means to said gasket ring and initially holding said gasket ring in position with respect to the groove in one of said bodies to be clamped between said bodies in said grooves with at least said outer side walls loaded against said gasket ring, and means independent of said retainer means clamping said bodies together, said means connecting said retainer means to said gasket ring being flexible to enable movement of said gasket ring during loading thereof, said radial surfaces engaging said retainer means to limit the loading of said gasket ring by said side walls.

2. In a connector as defined in claim 1; said retainer means being connected to said one of said bodies.

3. In a connector as defined in claim 1; said retainer means being a spacer ring clamped between said radial surfaces by said clamping means.

4. In a connector as defined in claim 1; said retainer means being a spacer ring clamped between said radial surfaces by said clamping means, said gasket ring having inner peripheral and end walls spaced from said inner side walls of said grooves and from the bottom of said grooves.

5. In a connector as defined in claim 1; said retainer means being a spacer ring clamped between said radial surfaces by said clamping means, and said gasket ring having passage means extending longitudinally thereof between said grooves.

6. In a connector as defined in claim 1; said retainer means comprising a ring member clamped between said bodies and limiting the loading of said gasket ring, said gasket ring being within the inner periphery of said spacer ring, and said means connecting said retainer means to said gasket ring being disposed between the inner periphery of said spacer ring and the outer periphery of said gasket ring.

7. In a connector as defined in claim 1; a sealing ring disposed about said retainer means and engaged between said flanges.

8. In a connector as defined in claim 1; said retainer means being a spacer ring clamped between said radial surfaces by said clamping means, and including resilient sealing means about the outer periphery of said spacer ring and sealingly engaged with said radial surfaces.

9. In a connector as defined in claim 1; said means connecting said retainer means to said gasket ring being an elastomeric body therebetween.

10. In a connector as defined in claim 1; said retainer means being carried by one of said bodies by means connecting said retainer means to said one of said bodies.

11. In a connector as defined in claim 1; said retainer means being a spacer ring disposed between said radial surfaces, and said retainer means being carried by one of said bodies further including fastener means connecting said spacer ring to said one of said bodies.

12. In a connector a pair of connector bodies having a fluid passage therein when said bodies are connected together, said bodies having opposed radial surfaces with circumferentially continuous grooves circumscribing said fluid passage and defined between inner and outer side walls converging outwardly from the bottom of the groove, a metal gasket ring in said grooves in sealing and radially inwardly loaded engagement with at least said outer side walls, retainer means, means connecting said retainer means to said gasket ring and initially holding said gasket ring in position with respect to the groove in one of said bodies to be clamped between said bodies in said grooves with at least said outer side walls loaded against said gasket ring, means independent of said retainer means clamping said bodies together, said means connecting said retainer means to said gasket ring being flexible to enable movement of said gasket ring during loading thereof, said radial surfaces engaging said retainer means to limit the loading of said gasket ring by said side walls; said retainer means having a number of rods projecting radially past said connector bodies and manually supportable to initially position said gasket ring with respect to said one of said bodies.

13. In a connector as defined in claim 12; said retainer means being clamped between said bodies and limiting the loading of said gasket ring by said walls.

14. In a connector as defined in claim 12; said means connecting said retainer means to said gasket ring being a metal web between said retainer means and said gasket ring.

15. In a connector as defined in claim 12; said means connecting said retainer means to said gasket ring being a metal web between said retainer means and said gasket ring and integral therewith.

16. For use in a connector having connector parts with opposed annular divergent sealing surfaces for receiving and axially and circumferentially loading a soft metal ring gasket; a subassembly comprising a support ring; a metal ring gasket within said support ring; said ring gasket having inner and outer walls converging towards opposite sides thereof; and flexible connecting means between said support ring and said ring gasket enabling axial movement of said ring gasket with respect to said support ring; said flexible connecting means including a thin web between said support ring and said ring gasket.

17. In a connector: a pair of connector bodies having a fluid passage therein when said bodies are connected together, said bodies having opposed radial surfaces with circumferentially continuous grooves circumscribing said fluid passage and defined between inner and outer side walls converging outwardly from the bottom of the groove, a metal gasket ring in said grooves in sealing and radially inwardly loaded engagement with at least said outer side walls, retainer means carried by one of said bodies, means connecting said retainer means to said gasket ring and initially holding said gasket ring in position with respect to the groove in one of said bodies to be clamped between said bodies in said grooves with at least said outer side walls loaded against said gasket ring, and means independent of said retainer means clamping said bodies together, said retainer means being engaged by and clamped between said bodies and limiting the loading of said gasket ring by said walls, and a resilient seal ring disposed about said retainer means and sealingly engaged between said radial surfaces.

18. In a connector as defined in claim 17; said retainer means being a spacer ring secured to said one of said bodies.

* * * * *